United States Patent
Krishnamoorthy

(10) Patent No.: US 10,395,853 B2
(45) Date of Patent: Aug. 27, 2019

(54) ELECTRODE AND PROCESS FOR PREPARING THE ELECTRODE AND DEVICES THEREOF

(71) Applicant: Council of Scientific & Industrial Research, New Delhi (IN)

(72) Inventor: Kothandam Krishnamoorthy, Maharashtra (IN)

(73) Assignee: Council of Scientific & Industrial Research, New Delhi (IN)

(*) Notice: Subject to any disclaimer, the term of this patent is extended or adjusted under 35 U.S.C. 154(b) by 243 days.

(21) Appl. No.: 15/175,629

(22) Filed: Jun. 7, 2016

(65) Prior Publication Data

US 2017/0348642 A1 Dec. 7, 2017

(51) Int. Cl.
| | | |
|---|---|---|
| C23C 18/16 | (2006.01) | |
| C23C 18/18 | (2006.01) | |
| C23C 18/30 | (2006.01) | |
| C23C 18/32 | (2006.01) | |
| C23C 18/42 | (2006.01) | |
| C23C 28/00 | (2006.01) | |
| C23C 28/02 | (2006.01) | |
| C25D 9/02 | (2006.01) | |
| D06M 11/83 | (2006.01) | |
| D06M 15/63 | (2006.01) | |
| D06M 13/152 | (2006.01) | |
| H01G 11/22 | (2013.01) | |
| H01G 11/52 | (2013.01) | |

(Continued)

(52) U.S. Cl.
CPC .......... H01G 11/58 (2013.01); C23C 18/1882 (2013.01); C23C 18/2066 (2013.01); C23C 18/30 (2013.01); C23C 18/36 (2013.01); C23C 18/38 (2013.01); C23C 18/44 (2013.01); C23C 28/00 (2013.01); C23C 28/023 (2013.01); C25D 9/02 (2013.01); D06M 11/83 (2013.01); D06M 13/00 (2013.01); D06M 13/152 (2013.01); D06M 15/61 (2013.01); D06M 15/63 (2013.01); D06M 23/08 (2013.01); H01G 11/22 (2013.01); H01G 11/52 (2013.01); C25D 13/12 (2013.01); D06M 2101/12 (2013.01); D10B 2211/04 (2013.01); D10B 2401/021 (2013.01); D10B 2505/04 (2013.01)

(58) Field of Classification Search
CPC ....... C23C 18/16–18/52; D06M 13/52; D06M 13/152; D06M 11/83; C25D 9/02; H01G 11/22; H01G 11/52; H01G 11/58
See application file for complete search history.

(56) References Cited

U.S. PATENT DOCUMENTS

| | | | | |
|---|---|---|---|---|
| 5,213,850 A | * | 5/1993 | Matsumura | ........... H05K 3/184 427/437 |
| 2003/0150353 A1 | * | 8/2003 | Kato | ..................... C23C 18/44 106/1.23 |

OTHER PUBLICATIONS

Das et al., "Phenols from Green Tea as a Dual Functional Coating to Prepare Devices for Energy Storage and Molecular Separation," Chem. Commun. 51, 11662-11664 (Jun. 8, 2015).*

(Continued)

Primary Examiner — Kregg T Brooks
(74) Attorney, Agent, or Firm — Locke Lord LLP; Andrew W. Smith

(57) ABSTRACT

An electrode, process for preparing the electrode and devices thereof. An electrode comprising at least one metal deposited on a substrate; and at least one electrically conducting polymer. The devices comprising the electrode for energy storage and molecular separation.

9 Claims, 8 Drawing Sheets

(51) Int. Cl.
| | |
|---|---|
| *H01G 11/58* | (2013.01) |
| *D06M 13/00* | (2006.01) |
| *D06M 15/61* | (2006.01) |
| *D06M 23/08* | (2006.01) |
| *C23C 18/20* | (2006.01) |
| *C23C 18/36* | (2006.01) |
| *C23C 18/38* | (2006.01) |
| *C23C 18/44* | (2006.01) |
| *D06M 101/12* | (2006.01) |
| *C25D 13/12* | (2006.01) |

(56) References Cited

OTHER PUBLICATIONS

Adam Kozak, "Effect of Deposition Characteristics on Electrochemically Prepared PEDOT Films," 2010 NNIN REU Research Accomplishments (2010).*

Wang et al., "In situ green synthesis of Ag nanoparticles on teapolyphenols-modified graphene and their catalytic reduction activity of 4-nitrophenol," Colloids and Surfaces A: Physicochemical and Engineering Aspects 485, 102-110 (2015).*

Tadas S. Sileika et al.: "Colorless Multifunctional Coatings Inspired by Polyphenols Found in Tea, Chocolate, and Wine," Angew Chem Int. Ed. Engl., 2013: 52(41); 10766-70.

* cited by examiner

ELECTRODE AND PROCESS FOR PREPARING THE ELECTRODE AND DEVICES THEREOF

FIELD OF THE INVENTION

The present invention relates to an electrode, process for preparing the electrode and devices thereof. Particularly, the present invention relates to an electrode comprising at least one metal deposited on a substrate; and at least one electrically conducting polymer. More particularly, the present invention relates to devices comprising an electrode for energy storage and molecular separation.

BACKGROUND AND PRIOR ART OF THE INVENTION

Supercapacitors ability to charge and discharge in a very short time span make them attractive for variety of unique applications. Conducting polymers (CPs) are widely explored as active material in supercapacitors due to the involvement of highly conducting long polymer chains in the redox process. Polyaniline, polypyrrole, polythiophene and its derivatives have been explored as active materials in supercapacitor. Amongst the conducting polymers, poly (3,4-ethylenedioxythiophene) (PEDOT) is one of the very stable polymer, hence it has been used in several commercial devices.

Conducting substrates with woven fibers and nanopores are vital for fabrication of devices for energy storage and molecular separation. Silk cocoons (SCs) have unique structure comprising very high aspect ratio micro fibers woven into a thin layer. The SCs are insulators. Deposition of metal on the SCs can impart electrical conductivity. However, due to the woven structure of SCs, metal deposition by evaporation is not possible.

Article titled "Colorless multifunctional coatings inspired by polyphenols found in tea, chocolate, and wine" by T S Sileika et al. published in *Angew Chem Int Ed Engl.*, 2013; 52(41); 10766-70 reports use of polyphenolic compounds present in tea, red wine, and chocolate to form thin adherent polyphenol films on substrates through spontaneous adsorption from solution. From this observation emerged a versatile and comprehensive approach to surface modification of a variety of solid, porous, and nanoparticulate substrates composed of metals, ceramics, and polymers.

The polyphenols (PP) in green tea adhere on variety of surfaces; hence they are suitable for developing a generic approach to prepare conducting substrates. However, the existing electroless metal deposition (EMD) methods are not effective to deposit metals on natural substrates.

Therefore, there is need in the art to provide effective electroless metal deposition (EMD) to deposit metals on natural substrates and effectively fabricate them in devices for energy storage and molecular separation.

OBJECTIVE OF THE INVENTION

The main objective of the present invention is to provide an electrode, process for preparing the electrode.

Another objective of the present invention is to provide a device using electrode for energy storage and molecular separation.

SUMMARY OF THE INVENTION

Accordingly, the present invention provides a process for preparation of an electrode, wherein the process step comprises:

a) immersing substrate in brewed green tea for a period of time in the range of 1-24 hours to obtain modified substrate;
b) immersing the modified substrate as obtained from step (a) in ammonical $AgNO_3$ solution for a period of time in the range of 10 minutes-8 hours to obtain silver nanoparticle coated substrate;
c) keeping silver nanoparticle coated substrate as obtained from step (b) in metal plating solution of the pH ranging between 7-10 for a period of time in the range of 8-24 hours to obtain metal coated substrate;
d) polymerizing the monomer on metal coated substrate as obtained from step (c) by soaking in electrically conducting solution for a period of time in the range of 5-30 minutes to obtain an electrode.

In preferred embodiment of the present invention, wherein the metal is selected from the group consisting of gold, palladium, nickel and copper.

In another preferred embodiment of the present invention, wherein the substrate is selected from the group consisting of silk cocoons, silk yarn, cotton clothes, cotton threads papers, tree leaves and synthetic substrates.

In yet another preferred embodiment of the present invention, wherein the synthetic substrate is selected from the group consisting of polycarbonate membranes, anodized alumina oxide membranes, glass slides and conducting glasses.

In still another preferred embodiment of the present invention, wherein the conducting glasses are selected from the group consisting of indium doped tin oxide and fluorine doped tin oxide.

In yet still another preferred embodiment of the present invention, wherein the electrically conducting solution is selected from the group consisting of polyaniline, polyethylene dioxythiophene, polypyrrole and derivatives of polythiophene.

In another embodiment of the present invention, wherein the electrode comprises:
a) at least one metal deposited on a substrate; and
b) at least one electrically conducting polymer.

In yet another embodiment of the present invention, wherein said electrode being fitted in a device, and the device is supercapacitor or molecular separator.

In yet still another embodiment of the present invention, a supercapacitor device comprises:
a) at least two electrodes, said electrode being as claimed in claim 7;
b) a polymer electrolyte filled porous separator;

In another embodiment of the present invention, wherein said electrolyte filled porous separator is selected from polymer electrolyte such as gel/plasticized electrolyte, PVA (polyvinyl alcohol)/acid or base or salts, PEO (polyethyleneoxide)/acid or base.

In yet another embodiment of the present invention, wherein the acid is selected from the group consisting of $H_2SO_4$, $H_3PO_4$, $HClO_4$.

In yet still another embodiment of the present invention, wherein the base is KOH.

In yet another embodiment of the present invention, the supercapacitor device as claimed in claim 10, wherein the salts selected from LiCl, $LiClO_4$, KCl.

In a preferred embodiment of the present invention, wherein said supercapacitor has capacitance in the range of 125 to 500 F/g.

In yet another preferred embodiment of the present invention, a molecular separator device comprises:
a) at least two half tubes; and
b) at least one electrode as claimed in claim 7 having polymer coated metal substrate membrane.

In yet still another preferred embodiment of the present invention, wherein the polymer is polyethylene dioxythiophene (PEDOT).

In another preferred embodiment of the present invention, wherein metal is gold.

In yet another embodiment of the present invention, wherein the substrate is anodized alumina oxide.

DETAILED DESCRIPTION OF THE INVENTION

Figure 1:
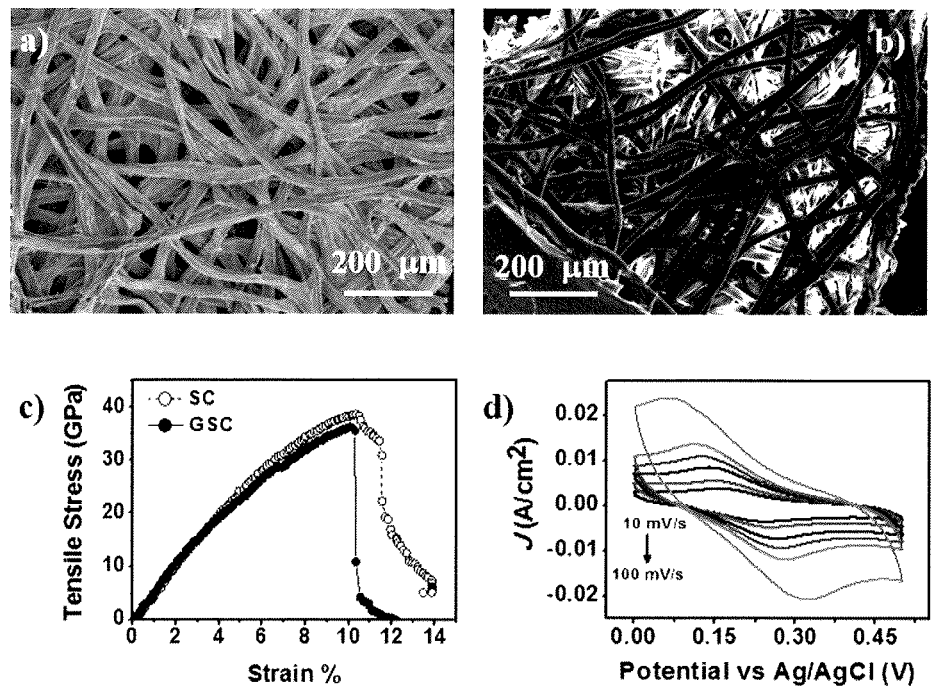
FIG. 1: SEM image of GSC (a) and SC (b). The charging of the silk fibers is visible in image b. Strain vs stress curve of SC and GSC (c). CV of ferrocene methanol recorded using GSCs as working electrode (d).

The invention will now be described in detail in connection with certain preferred and optional embodiments, so that various aspects thereof may be more fully understood and appreciated.

In view of the above, the present invention provides a process for preparation of an electrode, wherein the process step comprises:
a) immersing substrate in brewed green tea for a period of time in the range of 1-24 hours to obtain modified substrate;
b) immersing the modified substrate as obtained from step (a) in ammonical $AgNO_3$ solution for a period of time in the range of 10 minutes-8 hours to obtain silver nanoparticle coated substrate;
c) keeping silver nanoparticle coated substrate as obtained from step (b) in metal plating solution of the pH ranging between 7-10 for a period of time in the range of 8-24 hours to obtain metal coated substrate;
d) polymerizing the monomer on metal coated substrate as obtained from step (c) by soaking in electrically conducting solution for a period of time in the range of 5-30 minutes to obtain an electrode.

The present invention provides a device for energy storage comprising;
1. at least two electrodes comprises gold deposited substrate;
2. a electrolyte filled porous separator;
characterized in that said electrode is prepared by a process comprising the steps of:
a. coating polyphenol on the substrate;
b. forming a layer of silver nanoparticles on the surface of the substrate of step (a);
c. depositing the conducting metal to form a thin film on top of the substrate of step (b) to afford electrode;

In preferred embodiment, said device is supercapacitor or filtration device.

In another preferred embodiment, said electrically conducting polymeric material is selected from polyaniline (PANI) and polyethylene dioxythiophene (PEDOT), polypyrrole and other derivatives of polythiophene.

In yet another preferred embodiment, said electrolyte filled porous separator is selected from polymer electrolyte such as gel/plasticized electrolyte, PVA (poly vinyl alcohol)/Acid or Base or Salts, PEO (polyethyleneoxide)/Acid or Base, wherein the acid is selected from acid is selected from $H_2SO_4$, $H3PO_4$, $HClO_4$; salts selected from LiCl, $LiClO_4$, KCl.

A polymer electrolyte can be made by mixing polyvinyl alcohol (PVA) with an acid, base or salt. For our studies we have used PVA with $LiClO_4$ only.

In still another preferred embodiment, said substrate is selected from silk cocoons, silk yarn, cotton clothes, cotton threads papers, tree leaves as well as on synthetic substrates like polycarbonate membranes, anodized alumina oxide membranes, glass slides and conducting glasses like Iridium doped tin oxide (ITO) and Fluorine doped tin oxide (FTO).

In yet still another preferred embodiment, said conducting metal is selected from noble and transition like Gold (Au), Palladium (Pd), Nickel (Ni), Copper (Cu).

In yet still another preferred embodiment, said supercapacitor device shows capacitance in the range of 125 to 500 F/g.

In another embodiment, the polyphenols from green tea is used to electroless deposit gold on silk cocoons (GSCs) and nanoporous aluminum oxide (AAO) templates. The gold coated cocoons are used as electrode in supercapacitors with capacitance as high as 254 F/g and specific power of 2287 W/kg.

In another embodiment, a molecular separation device comprising gold coated alumina membranes (AAO) is useful for molecular separation based on charge and hydrophobicity.

In still another embodiment, PEDOT is electropolymerized on the surface and inside the pores of the gold coated AAO (pores are not completely filled), and oxidized PEDOT treated with negatively charged micelles of sodium dodecyl sulphate (SDS), the micelles disintegrate and render the pores to be hydrophobic.

The GSCs mechanical strength is found to be comparable to that of uncoated SCs. The GSCs are used as electrode to deposit poly(3,4-ethylenedioxythiophene) (PEDOT) and utilized for the fabrication of supercapacitors with specific capacitance as high as 254 F/g. The best energy and power densities were found to be 29 Wh/kg and 2303 W/kg. The EMD results in the formation of gold nanotubes embedded AAO. This template was used for molecular separation.

In one embodiment, the process for the preparation of GSCs is provided. The green tea extract is prepared by brewing the tea in hot water (100 □C) for one hour. SCs are immersed in this solution for 48 hrs. The PP coated SCs are immersed in ammonical silver nitrate solution for three hours. The color of SCs turned from milky white to brown indicating the formation of silver nanoparticles on the surface of the silk fibers. The silver coated SCs are immersed in gold plating solution for 72 hrs. The Ag nanoparticles reduce the $Au^+$ to Au and due to autocatalytic reaction, the gold deposition continued to form a thin film on top of the silk fibers.

Figure 8:
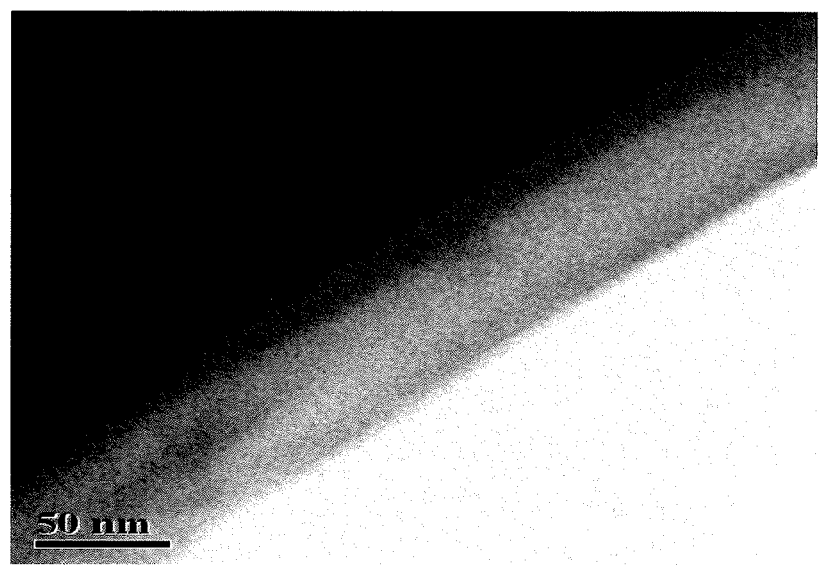
FIG. 8: TEM image of gold coated single silk fiber.

The conductivity of the gold coated fiber in the GSCs are calculated using different fibers and the values are found to vary between $1.8 \times 10^3$ S/cm and $2.2 \times 10^3$ S/cm. Scanning electron microscopy (SEM) is used to image the surface of the GSCs (FIG. 1a). The SEM images indicate the formation of smooth gold film throughout the SCs. Charge accumulation is not found during the imaging that indicates that the gold coating is highly conducting and uniform. Contrary to this, charge accumulation is observed in case of SCs (FIG. 1b), despite evaporation of gold to dissipate the charges during the electron microscopy imaging. This experiment further confirms that the evaporation of metal on SCs is not an effective method to impart conductivity. The thickness of electroless deposited Au on SCs is found to be ~50 nm using TEM (FIG. 8). Young's modulus is an important parameter that provides information about the strength of a substrate. The Young's modulus of SCs and GSCs is found to be 4.8 GPa and 4.7 GPa, respectively (FIG. 1c). This indicates that the green tea modification and subsequent electroless gold deposition didn't significantly alter the strength of the SCs. To study the suitability of GSCs as electrode, cyclicvoltammogram (CVs) of ferrocene methanol (FM) is recorded using GSCs as working electrode. Typical CV of FM is observed, which indicated the suitability of GSCs as electrode (FIG. 1d).

In one embodiment, the present invention provides a supercapacitor fabricated using the GSCs as electrode. Conjugated polymers are pseudocapacitive materials, among them PEDOT is a stable conducting polymer is used herein for supercapacitor fabrication. The GSCs are used as working electrode to electrochemically deposit PEDOT by oxidizing the monomer 3,4-ethylenedioxythiophene (EDOT). The quantity of polymer deposited on the electrode is controlled by controlling the duration of the polymerization. The polymerization is carried out for 50 (A), 100 (B) and 150 s (C).

A supercapacitor device consists of two electrodes. Out of the two electrodes, both electrodes could be metals or conducting polymers. These kinds of devices where both the electrodes are of similar material are known as symmetric device. The other type of devices is asymmetric wherein the two electrodes are different from each other. The electrodes could be two different conducting polymers or one metal electrode and a conducting polymer electrode.

Figure 2:
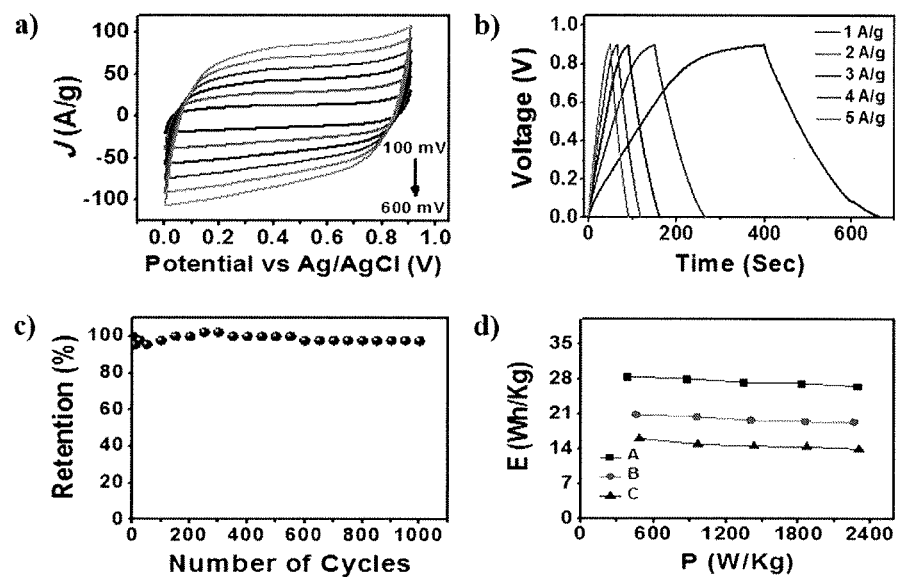
FIG. 2: CV of PEDOT deposited GSCs in 0.5 M H2SO4 at various scan rates (a). Charge discharge IV curves of A at various current densities (b). Plot of percentage specific capacity retention as a function of charge discharge cycles (c). Ragone plot showing the energy and power densities of electrodes A, B and C (d).
Figure 11:
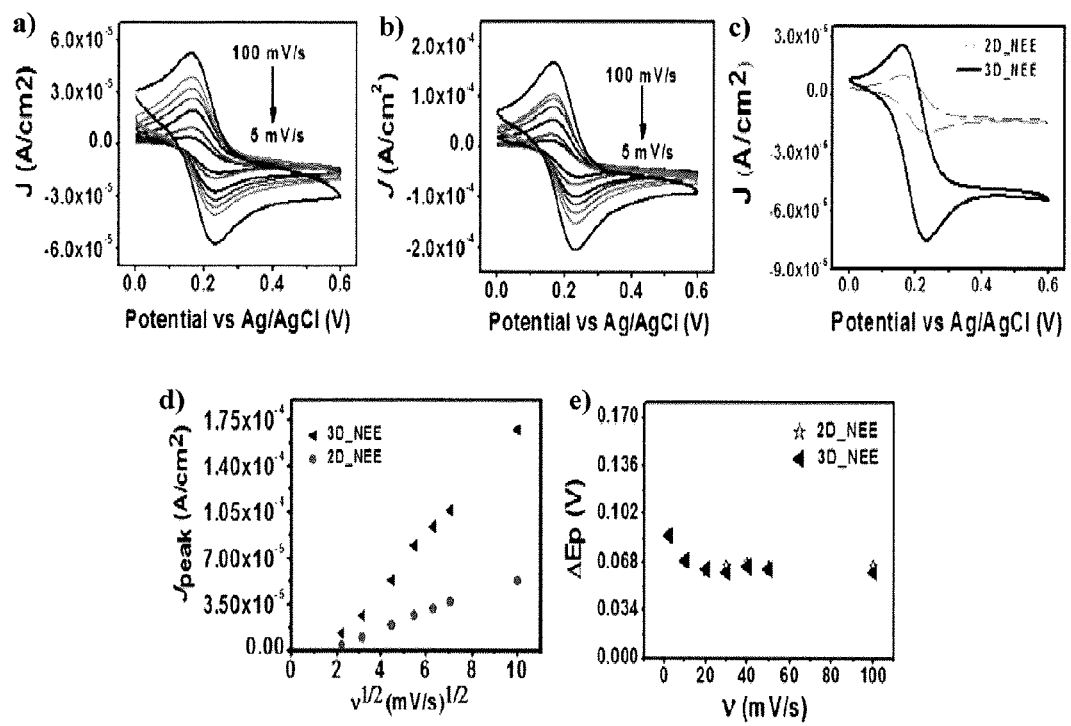
FIG. 11: CVs of ferrocene methanol with a) 2D_NEE and b) 3D_NEE as WE, c) 2D NEE and 3D NEE at scan rate 10 mV/s, d) plot of peak current density vs square root of scan rate and e) plot of ΔEp vs scan rate for 2D and 3D NEE.
Figure 12:
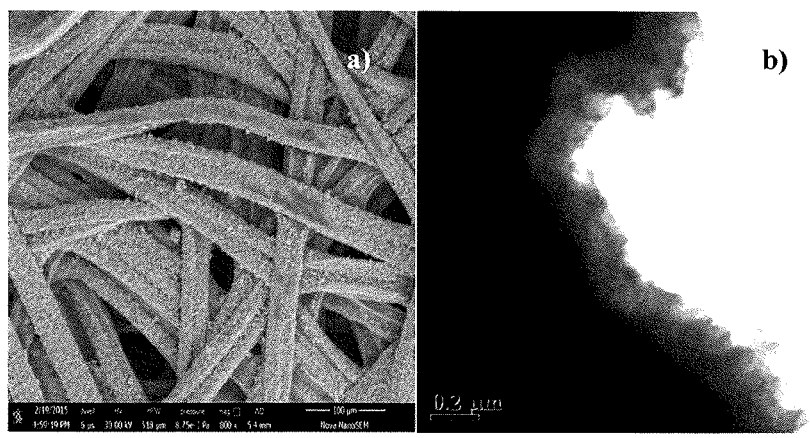
FIG. 12: SEM Images of electropolymerized PEDOT on a) GSC and b) TEM image of electropolymerized PEDOT on gold coated single fiber.
Figure 13:
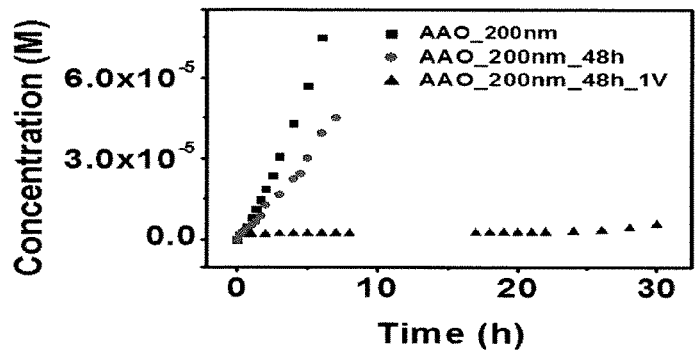
FIG. 13: Transport studies of naphthalene through AAO_200, gold coated AAO_200 nm_48 h and PEDOT charged at 1 V (AAO_200 nm_48 h_1V).
Figure 14:
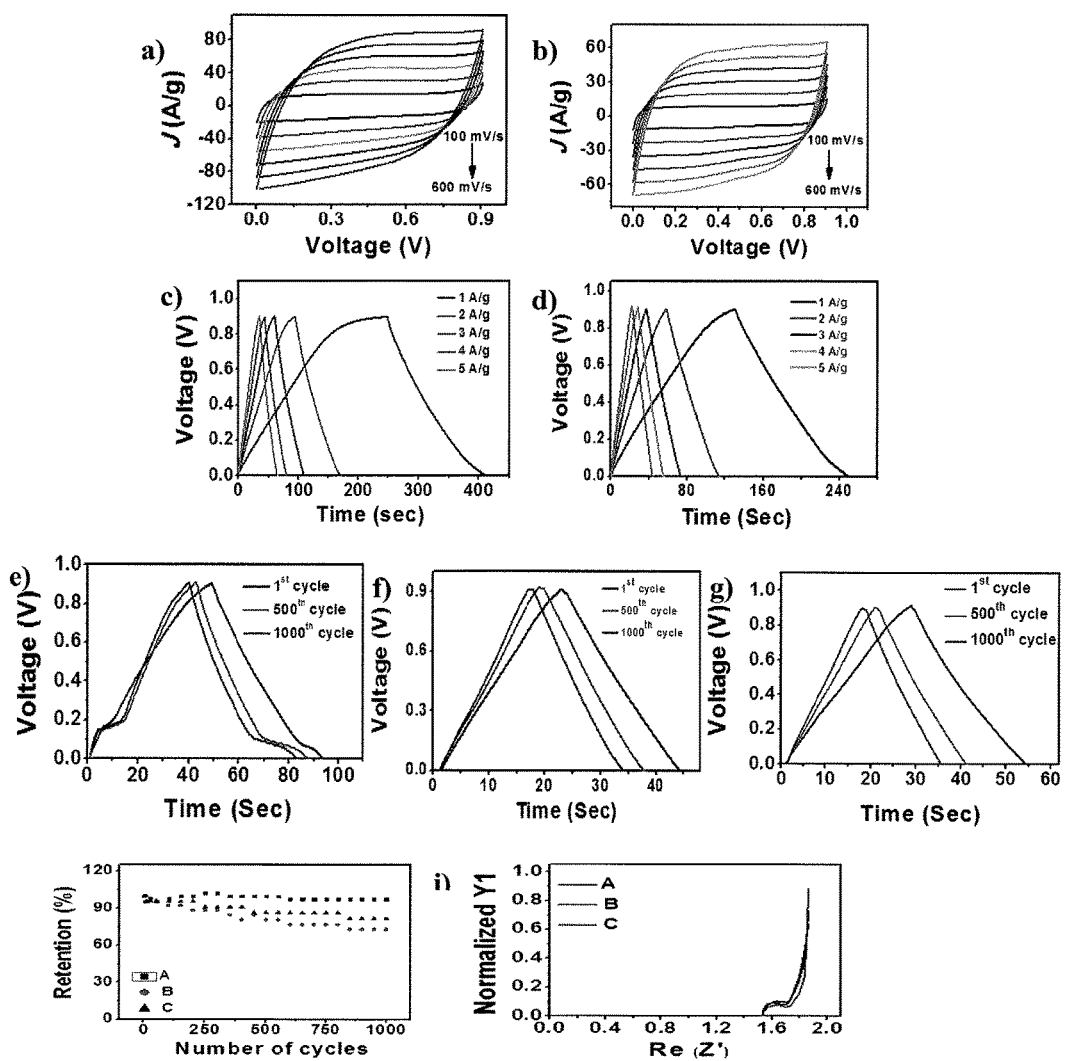
FIG. 14: Supercapacitor measurements of PEDOT on GSCs: CVs at various scan rates for a) B and b) C; charge-discharge curves at various current densities for c) B and d) C. 1st, 500th and 1000th cycles of charge-discharge for e) A, f) B and g) C; h) capacitance retention of 1000 charge-discharge cycles and (i) nyquist plot of A, B, C.

The redox characteristics of electrode A is studied in 0.5 M $H_2SO_4$ by cycling the potential between 0 and 0.9 V. A typical rectangular cyclicvoltammogram (CV) is observed (FIG. 2a). The charge discharge experiment is carried out between 0 and 0.9 V at various current densities. The charge discharge curves are not perfectly symmetric indicating IR drop in the pseudocapacitive PEDOT (FIG. 2b). The specific capacitance calculated from the slope of discharge curve is 254 F/g while discharging the capacitor at 1 A/g. The specific capacitance didn't decrease significantly as a function of cycling. Indeed, 94% of the specific capacitance is retained at 1000 cycles (FIG. 2c). A marginal decrease in specific capacitance is observed while increasing the current density from 1 A/g to 5 A/g. The lowest specific capacitance is 237 F/g for a current density of 5 A/g. For electrodes B and C, the CVs recorded in 0.5 M $H_2SO_4$ showed typical rectangular CVs (FIG. 11). The charge discharge curves of B and C are similar to A. However, the best specific capacitance for B and C were 186 F/g and 143 F/g, respectively. The decrease in specific capacitance is due to the peeling off of PEDOT from the electrode during the charge discharge cycling. This is a result of the presence of thicker PEDOT film on top of GSCs in case of electrodes B and C. From this discussion, it is clear that the best performance could be obtained with 50 s polymerization that correspond to a polymerization charge of 0.65 C (0.4 mg PEDOT). For electrodes A, B and C, power and energy densities are calculated at various current densities. For electrode A, a power density of 2287 W/kg and energy density of 29 Wh/kg is observed, which is better than that observed for electrodes B and C. The Ragone plot is shown in FIG. 2d. The electrochemical impedance spectra of electrodes A, B and C are recorded in 0.5 M $H_2SO_4$ using Pt foil as counter electrode and Ag/AgCl as reference electrode. The nyquist plot of the electrodes showed a semicircle with a linear segment at low frequency indicating mass transport. The high frequency intercept of the semi circle is used to calculate the Rct. The Rct of all the electrodes were about 1 □. Thus, the resistance of the films didn't vary significantly as a function of polymerization time.

Figure 3:
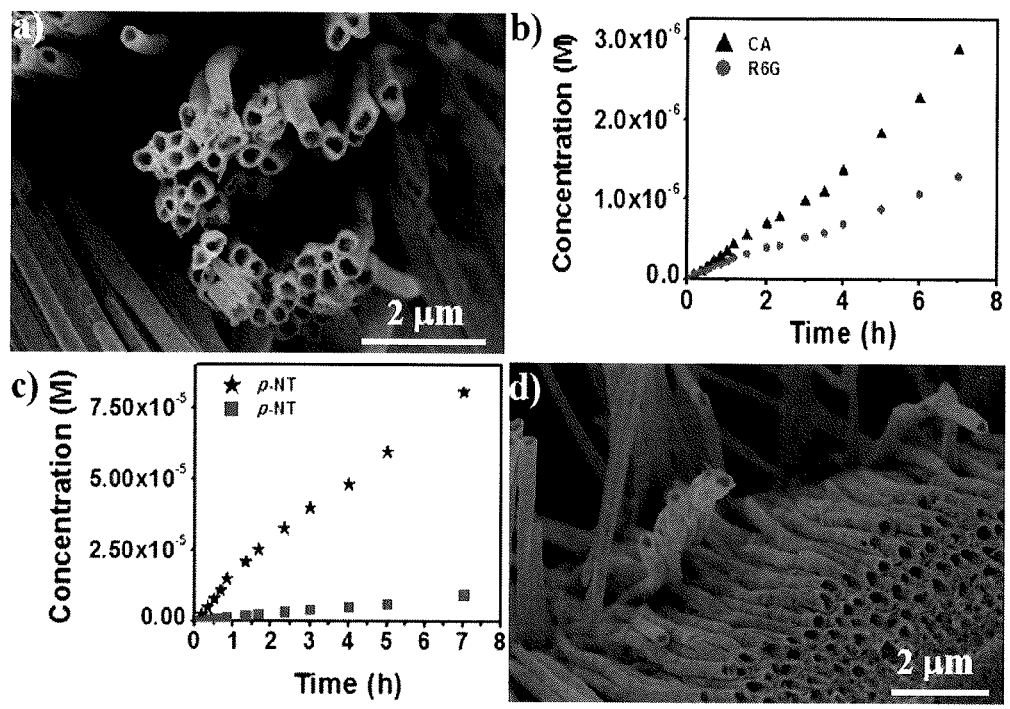
FIG. 3: (a) SEM image showing Au nanotubes liberated from AAO template. (b) Plot showing the differential transport of calcein and rhodamine 6G through PEDOT coated Au nanotubes embedded in AAO template. The potential applied on the electrode was 1 V (c) Time vs concentration plot showing differential transport of p-nitro toluene and p-nitro phenol through SDS modified PEDOT nanotubes in AAO template. Prior to SDS modification, a potential of 1 V was applied on PEDOT. (d) SEM image showing electroless deposited palladium nanotubes liberated from AAO templates.

The next set of experiments is carried out using AAO template. Although electroless gold deposition on polymer substrates is well developed, the same is not true in case of electroless deposition on AAO templates. Electroless deposition is carried out by following the procedure mentioned above. The Au nanotubes are liberated by dissolving the AAO template in 25% phosphoric acid. The SEM images indicate the formation of continuous nanotubes of gold in the pores of AAO template (FIG. 3a). The inner diameter of the gold nanotubes embedded in the AAO template is determined using diffusion of naphthalene. Based on the Fick's law of diffusion, the inner diameter of the gold nanotubes embedded in AAO is found to be 148 nm.

To impart functionality and decrease the inner diameter of the nanotubes, PEDOT is electrodeposited by applying a constant potential of 1.3 V vs Ag/AgCl. The as deposited polymer is converted to its neutral state by applying a constant potential of −0.6 V. After these steps, the pore diameter is determined to be 10 nm. This template is mounted at the center of a U tube. One arm of the U tube is used as feed with two dye molecules Rhodamine 6G (cationic dye) and Calcein (anionic dye) dissolved in phosphate buffer (pH=7.3). The reservoir had phosphate buffer of pH 7.3. Aliquots from the reservoir are withdrawn to study the transport of ions from the feed to the reservoir. By monitoring the peaks corresponding to the two dye molecules, the concentration of the transported molecules are determined. The slope of the plot of concentration vs time is rate of transport of dye molecules. The ratio of the rates is known as separation factor ($\alpha$). While using PEDOT coated AAO template that is oxidized at 0 V, Calcein is preferentially transported compared to Rhodamine 6G. The separation factor was found to be 1.2. The low separation factor indicates the presence of very few positive charges on the PEDOT surface. The $\alpha$ increased to 1.7 while using PEDOT coated AAO template, which is oxidized by applying a potential of 0.4 V. The $\alpha$ further increased to 2.5 for PEDOT coated AAO, which was oxidized at 1 V (FIG. 3b). Thus, the increase in oxidation potential increased the number of positive charges on the PEDOT that facilitated the transport of complementary charge bearing Calcein.

Figure 15:
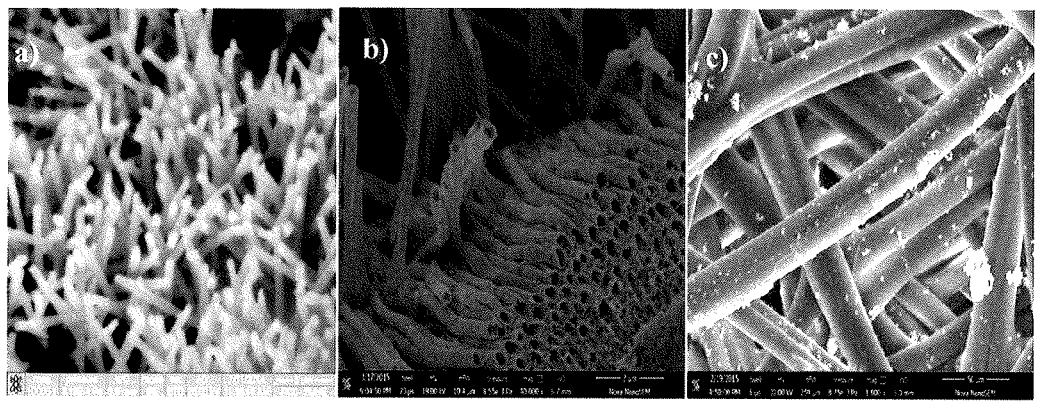
FIG. 15: Palladium deposited a) PCM_600, b) AAO_200 and c) SC.
Figure 16:
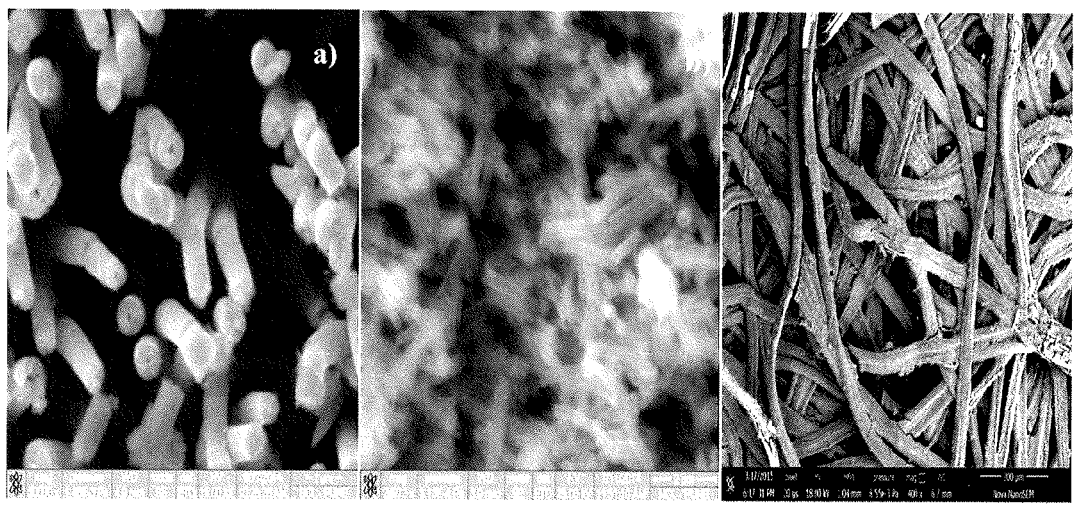
FIG. 16: Ni deposited a) PCM_600, b) AAO_200 and c) SC.
Figure 17:
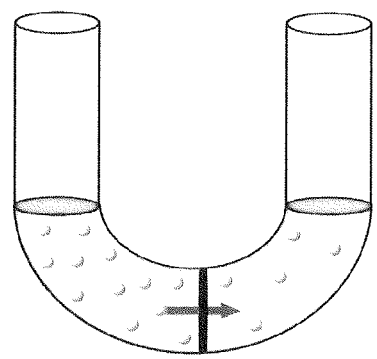
FIG. 17: Perspective schematic view of a Molecular Separator that consists of two half u-tubes and the modified membrane (PEDOT deposited on gold coated AAO) placed in between the half tubes. All the three components are claimed together. On half of the tube is filled with the mixture solution to be separated (known as feed) and the other half is filled with the solvent (the solvent used to make the feed solution).

In another embodiment, the present invention provides a device used for separation of molecules based on hydrophobicity. The separation set-up is as shown in the FIG. 17. It is consist of two half u-tubes and the modified membrane (PEDOT deposited on gold coated AAO) is placed in between the half tubes. All the three components are claimed together. On half of the tube is filled with the mixture solution to be separated (known as feed) and the other half is filled with the solvent (the solvent used to make the feed solution).

p-nitrophenol (p-NP) and p-nitrotoluene (p-NT) with small log P difference. The oxidized PEDOT is hydrophilic, hence it is not effective in separating molecules based on their hydrophobicity. Depending on the number of positive charges on the PEDOT, the number of SDS molecules sticking on the PEDOT is found to vary. This variation imparts different degree of hydrophobicity inside the nanopores. While using AAO template decorated with PEDOT oxidized at 0 V and modified with SDS, the $\alpha$ between p-NT and p-NP is found to be 1.1. Thus, the separation of molecules is insignificant. On the other hand, the $\alpha$ increased to 1.8, while the PEDOT is oxidized at 0.5 V and modified with SDS. The $\alpha$ further increased to 8.5, while the PEDOT is oxidized at 1 V with subsequent SDS modification (FIG. 3c). This proves that the gold deposited AAO modified with PEDOT and SDS is an efficient template based molecular separator. To demonstrate the efficacy of this green tea based metal deposition method, palladium and nickel nanostructures are also prepared using SCs, AAO and polycarbonate templates. The palladium nanotubes liberated from the AAO templates are shown in FIG. 3d. The SEM images of nanostructures prepared in AAO template using the green tea approach are shown in FIG. 15 and FIG. 16.

In yet another embodiment, the green tea based electroless deposition method is used to deposit metals in the nanopores of polycarbonate and AAO templates. The nanoporous membranes efficiently separated molecules based on charge and hydrophobicity. The same approach was used to prepare nanostructures and 2D and 3D NEE that are useful in electroanalysis.

Figure 6:
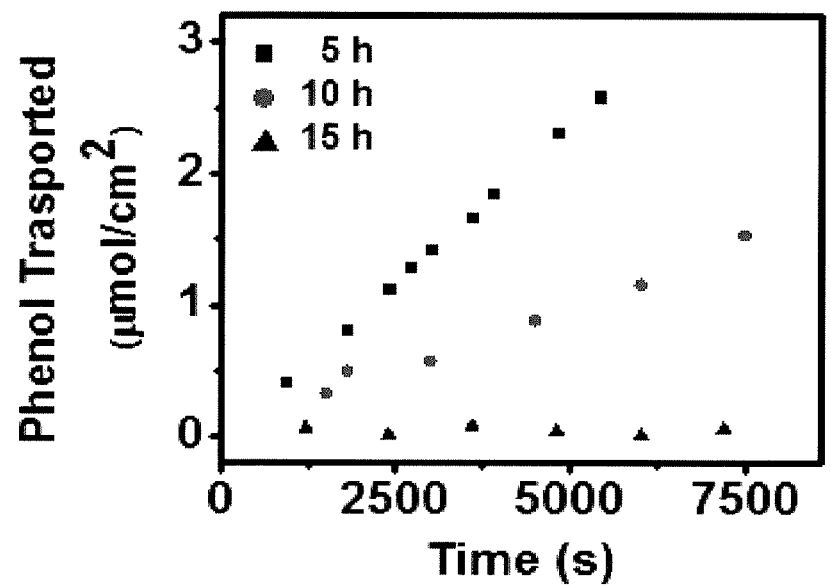
FIG. 6: Transport studies of phenol through gold coated PCM_30 nm for various deposition time (5 h, 10 h and 15 h).
Figure 7:
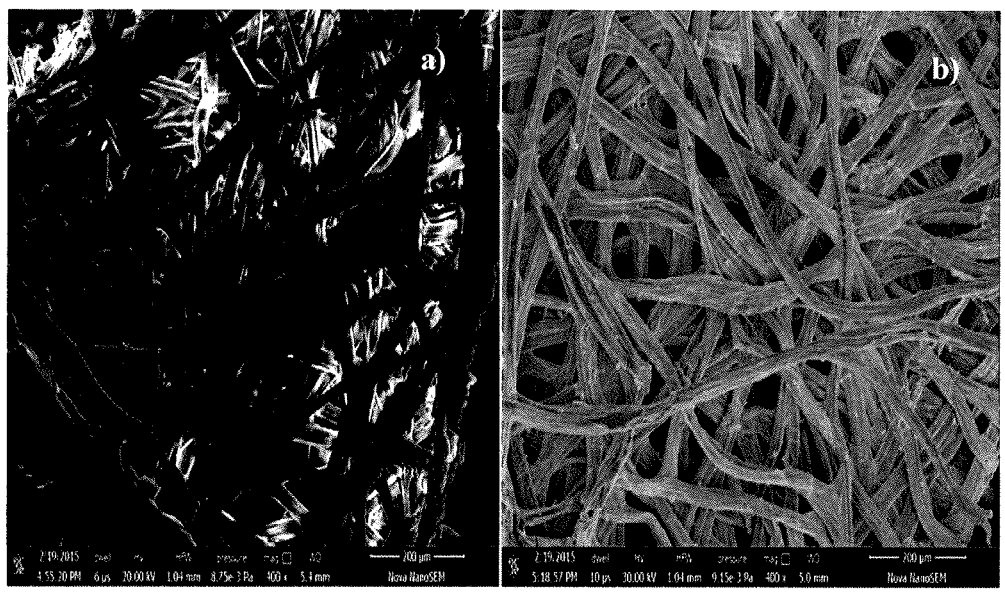
FIG. 7: SEM images of SC with evaporated gold (a) and GSC (b).

To study the effect of deposition time on the thickness of deposited gold, pore diameter is determined for PCM_30 after various deposition time 5 h, 10 h and 15 h. Pore diameter is determined by Fick's law of diffusion. The calculated pore diameter is 20 nm, 8 nm and 0 nm for 5 h, 10 h and 15 h respectively (FIG. 6).

Figure 9:
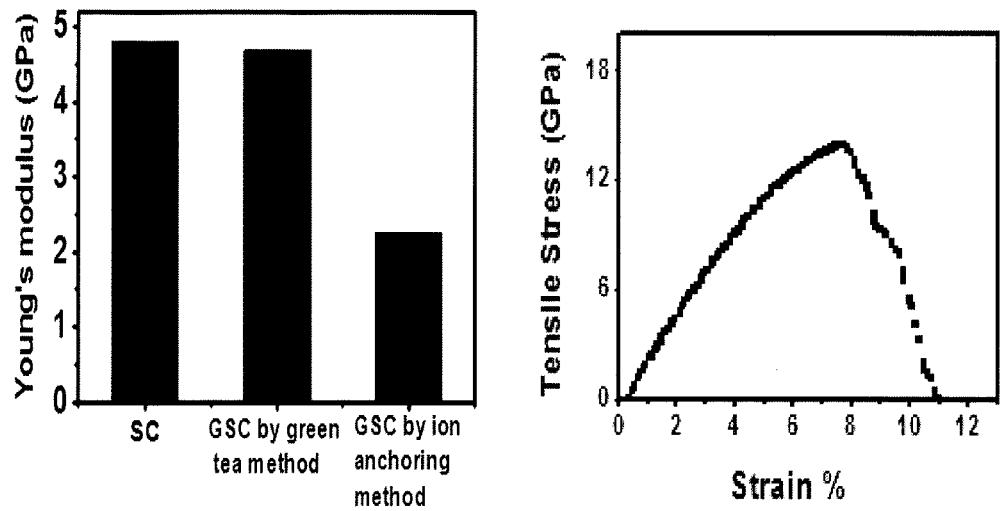
FIG. 9: Young's modulus of SC, GSC by green tea method and GSC by conventional ion-anchoring method (left); stress-strain curve of GSC by conventional ion-anchoring method.
Figure 10:
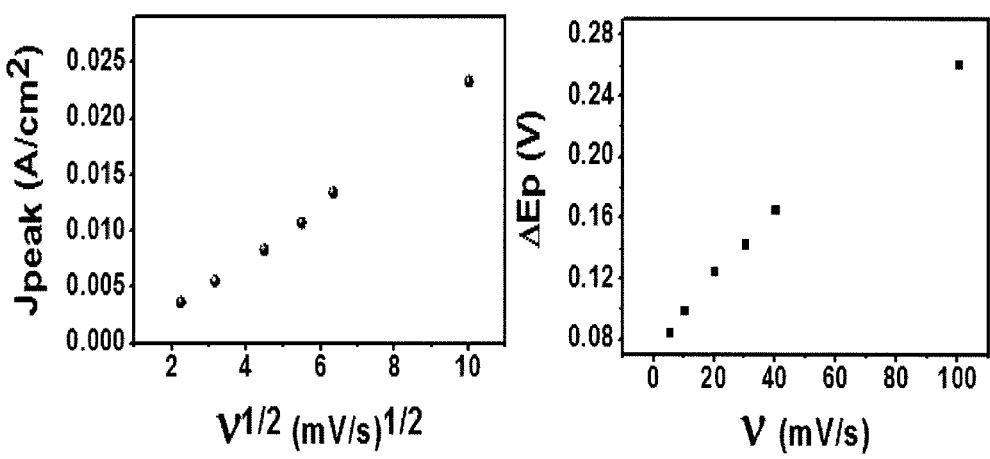
FIG. 10: Peak current density vs square root of scan rate (left) and ΔEp vs scan rate (right) obtained from the CVs of GSC.

The tensile strength measurement of GSC Dumbbell shaped SCs and GSCs are studied for mechanical strength. Tensile strength tester (Linkam tensile V3.1) is used for the experiments (FIG. 9).

Figure 5:
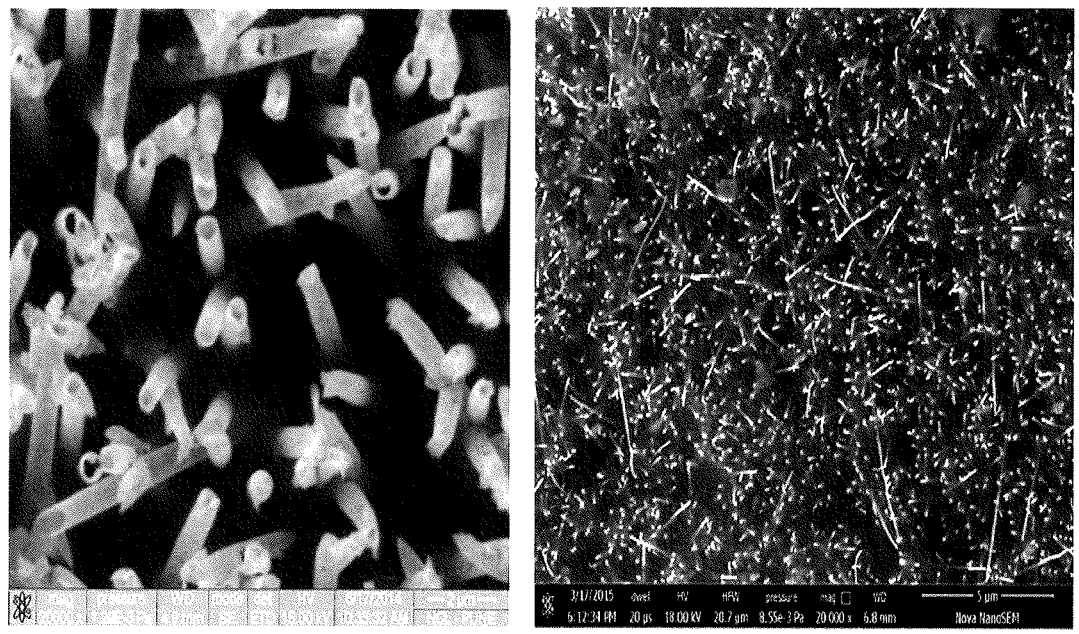
FIG. 5: Gold deposited PCM_600 (left) and PCM_30 (right) after oxygen plasma of 25 W for 5 min.

The gold deposited PCM_30 is used to study electrochemical behavior of two and three dimensional nano electrode ensembles (2D_NEE and 3D_NEE). The facial gold is removed from a gold deposited PCM_30 to get 2D_NEE. Gold film on one of the faces of the membrane is removed by using a Q-tip dipped in ethanol. The removal of gold film exposed 30 nm diameter gold disks embedded in the polycarbonate membrane. This electrode is known as 2D NEE. Using the gold film on one of the faces as contact, CVs of ferrocene methanol are recorded. The current density increased as a function of scan rate (v) and the plot of v½ vs I is found to be linear indicating diffusion controlled electrochemical process. In order to fabricate 3D NEE, the polycarbonate membrane is partially etched by oxygen plasma. The plasma etching is carried out for 5 minutes with the RF power of 25 W. Upon partial removal of polymer by oxygen plasma, gold nanowires protrude from the surface. The oxygen plasma etching results in the formation of 3D NEE. This experiment is carried out using several nanoporous (30 and 600 nm pore) polycarbonate templates. The protruding gold nanotubes can be seen in the SEM images (FIG. 5). CVs were recorded using the 3D NEE as working electrode in ferrocene methanol solution. Note that all WE area is kept constant by sticking a punched tape. The $\Delta$Ep is found to be 69 mV, which is comparable to the $\Delta$Ep of 2D NEE. The current density is found to scale as function of square root of scan rate confirming diffusion controlled electrochemical process. The current density of 2D NEE is found to be three times lower than the 3D NEE indicating the increase in the electroactive area of the 3D NEE. This 3D NEEs are effective in detecting analytes at concentrations as low as zeptomolar due to decreased capacitance.

The following examples, which include preferred embodiments, will serve to illustrate the practice of this invention, it being understood that the particulars shown are by way of example and for purpose of illustrative discussion of preferred embodiments of the invention.

Silk cocoon used in the invention are obtained from Central Sericulture Research and Training Institute, Government of India, Mysore and tea is commercially available Tately tea.

Example 1: Electroless Deposition of Gold on Substrate a) Electroless Deposition of Gold on Anodic Aluminum Oxide (AAO):

Green tea was brewed in hot water for 1 h. AAO of 200 nm pore diameter (AAO_200) was immersed in the brewed green tea for 5 h. The membrane was then washed in three sets of 50 ml deionized water by dipping in for 30 min each. Washed membranes were then immersed in 0.03 M ammonical $AgNO_3$ solution for 8 h and washed with water. The membrane looks faint brown in color confirming the reduction of silver ions. Finally the membrane was kept in gold plating solution (pH 9) for 48 hours at 5 □ C.1 Gold solution was changed after every 12 h.

b) Electroless Deposition of Gold on Polycarbonate Membrane (PCM):

Gold was deposited in PCM of 30 nm (PCM_30) and 600 nm (PCM_600) pore diameter. The same procedure was followed as described above in example 1 with only differences being the dipping duration and the pH of the plating solution. PCM was dipped in green tea for 12 h. pH of the plating solution was 10 and deposition time was 24 h.

c) Electroless Deposition of Gold on SCs:

The inner layers of a cocoon have more tightly woven silk fibers. Hence innermost layer was removed and the SCs were dipped in methanol and sonicated for fifteen minutes to loosen the layers. Green tea was brewed in hot water (100° C.) for 1 h. Silk cocoons (SCs) were immersed in this solution for 48 hrs. Then the SCs were washed with deionized water. Washed SCs were immersed in 0.03 M ammonical $AgNO_3$ solution for 3 h and washed with water. The color of SCs turned from milky white to brown confirming the reduction of silver. Finally the SCs were kept in gold plating solution (pH 7.5) for 72 hours at 5° C. Gold solution was changed after every 12 h. The resistance of the gold coated fiber in the GSCs was measured with multimeter using different fibers and the calculated conductivity values were found to vary between 1.8×103 S/cm and be 2.2×103 S/cm.

d) Electroless Deposition of Gold on Silk Yarn:

Green tea was brewed in hot water (100° C.) for 1 h. Silk yarn (SYs) were immersed in this solution for 1 hr. Then the SYs were washed with deionized water. Washed SYs were immersed in 0.03 M ammonical $AgNO_3$ solution for 30 min and washed with water. The color of SYs turned from milky white to brown confirming the reduction of silver. Finally the SYs were kept in gold plating solution (pH 7.5) for 12 hours at 5° C.

Example 2: Electropolymerization of EDOT on GSCs

Electropolymerization was performed in a standard 3-electrode configuration, the above gold coated silk cocoons (GSCs) were taken as WE, Pt-foil was used as CE and a constant potential of 1.2 V vs Ag/Ag+ was applied in a 10 mM acetonitrile solution of EDOT and 100 mM lithium perchlorate as supporting electrolyte. Before polymerization, GSCs were soaked for 30 min in monomer electrolyte solution. The polymerization was carried out for 50 (A), 100 (B) and 150 s (C). After polymerization, the electrodes were washed with the monomer free electrolyte to remove unreacted monomer.

Example 3: Electrochemical Performance of PEDOT on GSCs

Electrochemical characterizations were performed in a standard 3-electrode configuration. The above PEDOT coated GSCs were used as WE, Pt-foil as CE, Ag/AgCl as RE and 0.5 M H2SO4 (aq.) as electrolytic solution. CV and cyclic charge-discharge (CCD) were performed on Multichannel Autolab MAC 80038 instrument and electrochemical impedance spectroscopy (EIS) was measured on Biologic instrument. The CVs were recorded in potential range of 0 to 0.9 V at various scan rates. The CCDs were measured at different current densities from 1 to 5 A/g. The EIS was performed in the frequency range from 50 kHz to 10 Hz. All the measurements were carried out at room temperature. The specific capacitance calculated from the slope of discharge curve.

Example 4: Electropolymerization of EDOT on AAO

Figure 4:
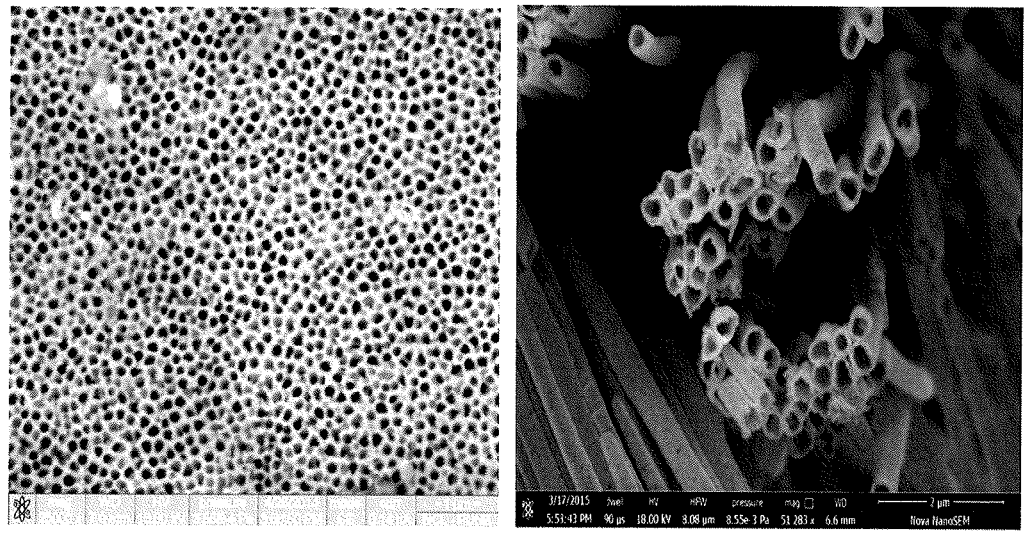
FIG. 4: Gold deposited AAO_200, top view after Ar-plasma treatment (left) and AAO dissolved (right).

Before electropolymerization of EDOT the gold deposited AAO was treated with Ar plasma for 5 min at RF power of 25 W (FIG. 4) to remove surface gold. To keep the area constant a punch tape was stuck on the membrane. For electropolymerization, the above Ar-plasma treated gold deposited membrane was taken as WE, Pt-foil was used as CE and a constant potential of 1.3 V vs Ag/AgCl for 10 s was applied in a 10 mM aqueous solution of EDOT and 100 mM lithium perchlorate as supporting electrolyte. Then –0.6 V vs Ag/AgCl was applied for 10 s. For creating positive charge, constant potential of 0.4 V and 1.0 V vs Ag/AgCl was applied to the PEDOT coated membranes for 2 min. The electrolytic solution was 100 mM aqueous lithium perchlorate without any monomer. Pt-foil was taken as CE. SDS (Sodium dodecyl sulphate) Treatment: Aqueous solution of 10 mM (above CMC) SDS was filtered through the positively charged PEDOT coated membranes in vacuo. 0.2 ml of solution was filtered four times and washed with copious amount of water.

Example 5: Electropolymerization of PEDOT on SYs

Electropolymerization was performed in a standard 3-electrode cell configuration, the above gold coated SYs were taken as WE, Pt-foil was used as CE and a constant potential of 1.3 V vs Ag/AgCl was applied in a 10 mM aqueous solution of EDOT and 100 mM lithium perchlorate as supporting electrolyte. Before polymerization, GSCs were soaked for 5 min in monomer electrolyte solution. The polymerization was carried out for 5 (A), 10 (B) and 15 s (C). After polymerization, the electrodes were washed with the monomer free electrolyte to remove unreacted monomer.

Example 6: Electroless Deposition of Palladium

SC, AAO_200 and PCM_100 after green tea and silver modification were dipped in Pd plating bath for an hour. 10 ml of Pd bath contains $PdCl_2$ (0.002 g), HCl (0.004 ml), $NH_4OH$ (1.6 ml), $NH_4Cl$ (0.27 g) and $Na_2HPO_2$ (0.1 g). pH of the bath was adjusted to 8.5 by HCl. Temperature of the bath was maintained at 60° C.

Example 7: Electroless Deposition of Nickel

SC, AAO_200 and PCM_100 after green tea modification was dipped in $PdCl_2$ solution (0.002 g $PdCl_2$, 2 drops of HCl and 50 ml water) for an hour and washed with water. Then dipped in Ni bath for 3 h. 10 ml of Ni bath contains $NiSO_4$ (0.0.875 g), citric acid (0.375 g), sodium acetate (0.125 g) and $Na_2HPO_2$ (0.5 g). pH of the bath was adjusted to 8.5 by HCl. The bath was kept at room temperature.

Example 8: Fabrication of Supercacitor a) Fabrication of Supercacitor with SCs:

With PEDOT coated GSCs we carried all the supercapacitor studies in a three electrode system. PEDOT coated GSCs were used as the active electrode and GSCs were used as the CE. The electrolyte was 1 M $H_2SO_4$ and the potential was applied with respect to Ag/AgCl reference electrode.

b) Fabrication of Supercacitor with Paper:

PEDOT was electropolymerized on gold coated paper. A symmetric supercapacitor device was fabricated using the above PEDOT coated paper where both the electrodes are same. A separator soaked in gel electrolyte was placed in between these two electrodes.

c) Fabrication of Yarn Supercapacitors:

For fabrication of yarn supercapacitor device, Au coated SYs (GSYs) were used as CE and PEDOT coated GSYs were used as active electrode. Both this electrodes were soaked in gel electrolyte ($PVA\_LiClO_4$) air dried and twisted around each other. This twisted device was then used to study all the electrochemical performance for a supercapacitor. The highest capacitance that could be achieved from the yarn supercapacitor was 500 F/g and the lowest was 162 F/g.

Example 8

Molecular Separation

The gold coated alumina membranes (AAO) were used to demonstrate molecular separation based on charge and hydrophobicity. For this purpose, we have again exploited PEDOT. PEDOT was electropolymerized on the surface and inside the pores of the gold coated AAO (pores are not completely filled). PEDOT, when oxidized, bears positive charges. Oxidized PEDOT treated with negatively charged micelles of sodium dodecyl sulphate (SDS), the micelles disintegrate and render the pores to be hydrophobic. Then these hydrophobic pores can be used to separate a mixture of molecules which have different hydrophobicity. We have taken mixture of p-nitrophenol (139.11 g/mol) and p-nitrotoluene (137.13 g/mol) which are very close to each other in hydrophobicity. P-nitrotoluene being more hydrophobic than p-nitrophenol due to hydrophobic interaction p-nitrotoluene passes through the pores thus separating the mixture. The hydrophobicity was tuned by varying the potential applied for oxidizing PEDOT. Higher the applied potential was higher was the positive charge in the pores and higher was the hydrophobicity.

The positively charged pores before being interacted with SDS micelles were used for separating a mixture of dyes which were oppositely charged. The dyes used were Rhodamine 6G (479.02 g/mol) as positively charged dye and calcein (622.55 g/mol) as the negatively charged dye. Since similar charges are repelled, calcein passes through the positively charged pores. Here again, the separation was tuned by varying the oxidizing potential of PEDOT.

These pores can also be used to separate molecules based on size.

Also, note that the pore size can be controlled by controlling the time of PEDOT deposition or gold deposition.

Experimental Details

Electropolymerization of EDOT on AAO

Before electropolymerization of EDOT the gold deposited AAO was treated with Ar plasma for 5 min at RF power of 25 W (FIG. S1) to remove surface gold. To keep the area constant a punch tape was stuck on the membrane. For electropolymerization, the above Ar-plasma treated gold deposited membrane was taken as WE, Pt-foil was used as CE and a constant potential of 1.3 V vs Ag/AgCl for 10 s was applied in a 10 mM aqueous solution of EDOT and 100 mM lithium perchlorate as supporting electrolyte. Then −0.6 V vs Ag/AgCl was applied for 10 s.

SDS (Sodium Dodecyl Sulphate) Treatment

Aqueous solution of 10 mM (above CMC) SDS was filtered through the positively charged PEDOT coated membranes in vacuo. 0.2 ml of solution was filtered four times and washed with copious amount of water.

Results

Hydrophobicity Based Separation

| Potential Applied (V) | Pore* Diameter (nm) | Separation Factor ($\alpha$) |
|---|---|---|
| 0.0 | 11 | 1.1 |
| 0.5 | 9 | 1.8 |
| 1.0 | 7 | 8.9 |

Charge Based Separation

| Potential Applied (V) | Pore* Diameter (nm) | Separation Factor ($\alpha$) |
|---|---|---|
| 0.0 | 10 | 1.2 |
| 0.4 | 16.6 | 1.7 |
| 1.0 | 15 | 2.5 |

*pore diameters were determined by the diffusion of naphthalene by Fick's law of diffusion.

ADVANTAGES OF THE INVENTION

The polyphenol method for metal deposition thus provides an advantage over the conventional method, as polyphenols do not need any anchoring group on the substrate and the method can be applied on a wide range of substrates.

The ion-complexation in the conventional method damages the natural substrates. On the other hand polyphenols forms a protective layer on the substrates and hence retains the strength of the natural substrates subjected to the method.

The method can be applied on a wide variety of natural as well as synthetic substrates irrespective of its chemical composition. Also the choice of metal is not limited only to gold. Metals like Pd, Ni and Cu also can be deposited on any substrates.

The polyphenol method of metal deposition also provides an advantage over metal evaporation methods.

I claim:

1. A process for preparation of an electrode, wherein the process step comprises:
    a) immersing a substrate in brewed green tea for a period of time in the range of 1-24 hours to obtain a modified substrate;
    b) immersing the modified substrate as obtained from step (a) in an ammonical AgNO3 solution for a period of time in the range of 10 minutes-8 hours to obtain silver nanoparticle coated substrate;
    c) keeping the silver nanoparticle coated substrate as obtained from step (b) in a metal plating solution of the pH ranging between 7-10 for a period of time in the range of 8-24 hours to obtain a metal coated substrate; and
    d) polymerizing a monomer on the metal coated substrate as obtained from step (c) by soaking in electrically conducting solution for a period of time in the range of 5-30 minutes to obtain an electrode.

2. The process as claimed in claim 1, wherein the metal is selected from the group consisting of gold, palladium, nickel and copper.

3. The process as claimed in claim 1, wherein the substrate is selected from the group consisting of silk cocoons, silk yarn, cotton clothes, cotton threads papers, tree leaves and synthetic substrates.

4. The process as claimed in claim 3, wherein the synthetic substrate is selected from the group consisting of polycarbonate membranes, anodized alumina oxide membranes, glass slides and conducting glasses.

5. The process as claimed in claim 4, wherein the conducting glasses is selected from the group consisting of indium doped tin oxide and fluorine doped tin oxide.

6. The process as claimed in claim 1, wherein the monomer in the electrically conducting solution includes a monomer of the material selected from the group consisting of polyaniline, polyethylene dioxythiophene, polypyrrole and derivatives of polythiophene.

7. The process as claimed in claim 1, wherein the substrate is not already treated with brewed green tea prior to immersing the substrate in brewed green tea, and wherein immersing the modified substrate as obtained from step (a) includes immersing the modified substrate in ammonical $AgNO_3$ without immersing the modified substrate in brewed green tea for longer than 24 hours.

8. The process as claimed in claim 7, wherein polymerizing the monomer includes polymerizing the monomer without keeping the silver nanoparticle coated substrate in the metal plating solution for more than 24 hours.

9. The process as claimed in claim 1, wherein polymerizing the monomer includes polymerizing the monomer without keeping the silver nanoparticle coated substrate in the metal plating solution for more than 24 hours.

* * * * *